Feb. 7, 1928.
L. VINGHEROETS
1,658,066
WHEEL REMOVER
Filed Oct. 28, 1925
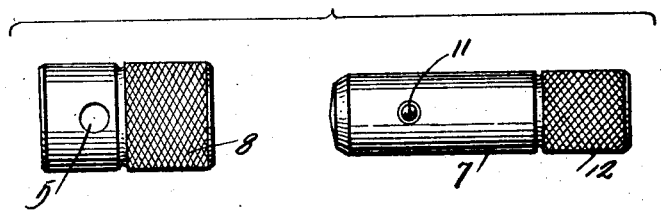
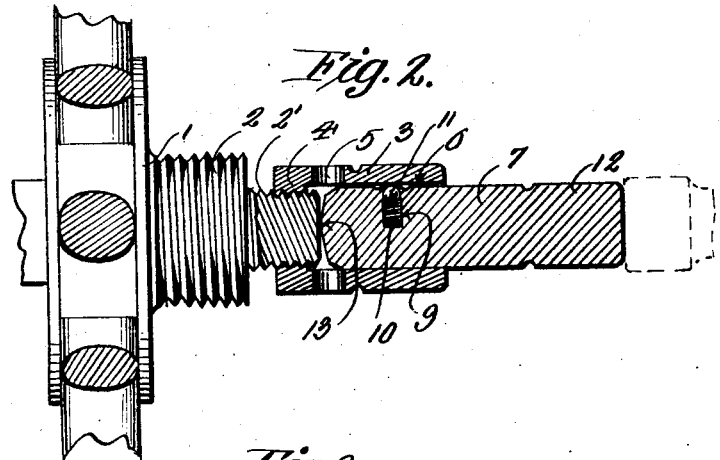
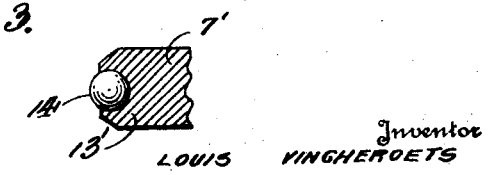
WITNESSES
Inventor
LOUIS VINGHEROETS
By Richard Owen, Attorney Patented Feb. 7, 1928.

1,658,066

UNITED STATES PATENT OFFICE.

LOUIS VINGHEROETS, OF GRAND RAPIDS, MICHIGAN.

WHEEL REMOVER.

Application filed October 28, 1925. Serial No. 65,427.

This invention relates to a wheel remover and has for its object the production of a simple and efficient wheel remover including a punch or drift and which may be attached to the threaded end of the axle of the wheel and by tapping the punch or drift, the wheel of an automobile may be very easily removed from the axle.

Another object of this invention is the production of a simple and efficient wheel remover which consists of a minimum number of parts and which may be manufactured at a minimum cost.

With these and other objects in view, this invention consists of certain novel constructions, combinations and arrangements of parts as will be hereinafter fully described and claimed.

By referring to the drawings, it will be seen that,

Figure 1 designates a side elevation of the wheel remover, the two sections of which are shown separated.

Figure 2 is a longitudinal section through the wheel remover.

Figure 3 is a longitudinal section through one end of a modified form of the punch or drift which may be used in connection with the wheel remover.

Heretofore, wheels have been removed from tapering axles by knocking the axle directly at the end thereof with a hammer, this naturally resulting in injury to the axle. Other removers have been produced which cause injury to the wheel or axle in various ways, and for this reason I have produced a special design of a wheel remover which is particularly adapted for use in removing automobile wheels from their axles without injury to the wheel or the axle.

By referring to the drawings, it will be seen that 1 designates the wheel of the usual type which is provided with the usual threaded portion 2, common to the usual type of automobile wheel.

The wheel remover proper which I have produced, consists of a sleeve 3 having an internally threaded portion 4, which internally threaded portion 4 is adapted to be threaded over the axle 2′ of the wheel by means of the hand or a wrench, or a suitable turning pin may be placed within one of the apertures 5 in sleeve 3 for facilitating the threading of the sleeve upon the threaded portion 2′ of the axle. The sleeve 3 is provided with a longitudinally extending socket 6 as shown in Figure 2, within which longitudinally extending socket 6 is slidably mounted the floating drift or punch 7. The sleeve 3 may be knurled as indicated at 8 upon the outer face thereof for facilitating the threading of the sleeve upon the threaded portion 2′ of the axle.

As shown in Figures 1 and 2 the punch or drift 7 is provided with a transversely extending socket 9, within which is mounted a spring 10, the spring 10 engaging a ball 11, the ball in turn engaging the inner face of the longitudinally extending socket 6 of the sleeve 3 and holding the drift 7 against accidental sliding movement within the sleeve 3. The outer end of the socket 9 formed within the drift 7 is punched inwardly so as to overhang a portion of the ball 11 and prevent the ball from being accidentally displaced from the socket 9 through the action of the spring 10. Sufficient movement is permitted, however, to permit the ball 11 to slide freely over the inner face of the socket 6 formed within the sleeve 3. The outer end of the drift or punch 7 is knurled as indicated at 12 to facilitate the movement of the punch or drift through the sleeve 3. The inner end of the punch or drift 7 is rounded and tapered as indicated at 13 to facilitate the engagement of the axle 2′ at its center by this punch or disc 7.

In Figure 3 I have shown a modified form of the invention wherein the inner end 13′ of the drift or punch 7′ is provided with a ball 14 for engagement with the end of the axle 2′, the outer end of the socket which supports the ball 14 being punched slightly inwardly to retain the ball in its proper position.

From the foregoing description, it will be seen that a very simple and efficient means has been produced for facilitating the removal of a wheel from its axle, and it should be understood that the sleeve 3 is adapted to be threaded upon the threaded portion 2 of the axle 2′ and the punch or drift 7 is adapted to be moved longitudinally through the socket 6 formed in the sleeve 3. The inner end 13 is adapted to rest against the outer end of the shaft or axle 2′ and this may be gauged by the operator, since he can easily see through the apertures 5 formed in the sleeve 3. Then by striking the outer end of the drift or punch 7 with a hammer or other tool, the jar will cause the wheel 1 to become loosened from the tapering axle.

It should be understood that certain detailed changes may be employed in this device, without departing from the spirit of the invention, so long as these changes fall within the scope of the appended claim.

It should be understood that the sleeve 3 may be formed of various sizes, although the sockets 6 are adapted to be formed of uniform size in order to receive the drift or punch 7. In this way, various sized threaded portions 4 may be formed upon various sleeves to accommodate the same punch or drift 7.

Having described the invention, what is claimed is:

A wheel remover of the character described, comprising a sleeve body provided at one end with an internally threaded portion designed to engage one end of an axle, and further having the inner face of the wall thereof provided with a longitudinally extending groove extending from that end remote from the threaded end and throughout substantially the entire length of the body, a punch body of substantial length designed to extend into said sleeve and having a recess formed in the side thereof adjacent the forward end, and a spring pressed ball positioned in said recess and extending slightly therefrom for engagement in the groove of said sleeve, substantially as and for the purpose described.

In testimony whereof I affix my signature.

LOUIS VINGHEROETS.